United States Patent
Haile et al.

(10) Patent No.: US 8,480,923 B2
(45) Date of Patent: Jul. 9, 2013

(54) THERMOCHEMICAL SYNTHESIS OF FUELS FOR STORING THERMAL ENERGY

(75) Inventors: Sossina M. Haile, Pasadena, CA (US); William C. Chueh, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 13/459,030

(22) Filed: Apr. 27, 2012

(65) Prior Publication Data

US 2012/0276493 A1    Nov. 1, 2012

Related U.S. Application Data

(63) Continuation of application No. 12/257,840, filed on Oct. 24, 2008, now Pat. No. 8,167,961.

(60) Provisional application No. 61/000,500, filed on Oct. 26, 2007.

(51) Int. Cl.
*B01J 23/10* (2006.01)
*C09K 3/00* (2006.01)

(52) U.S. Cl.
USPC ........................ 252/182.32; 502/304

(58) Field of Classification Search
USPC ........................ 252/182.32; 502/304
See application file for complete search history.

(56) References Cited

U.S. PATENT DOCUMENTS

| | | | |
|---|---|---|---|
| 4,230,682 A | 10/1980 | Bamberger | |
| 4,237,105 A | 12/1980 | Bamberger et al. | |
| 4,276,279 A | 6/1981 | Robinson et al. | |
| 4,309,403 A | 1/1982 | Robinson et al. | |
| 4,313,925 A | 2/1982 | Bamberger | |
| 6,440,596 B1 | 8/2002 | Ruhl et al. | |
| 8,206,671 B2* | 6/2012 | Takeshima et al. | 423/263 |
| 2003/0115800 A1 | 6/2003 | Yamada et al. | |
| 2006/0058184 A1 | 3/2006 | Jiang et al. | |
| 2007/0237998 A1 | 10/2007 | Armstrong et al. | |
| 2012/0129690 A1* | 5/2012 | Larcher et al. | 502/304 |

OTHER PUBLICATIONS

International Preliminary Examination Report and Written Opinion dated Apr. 27, 2010, issued in related International Patent Application No. PCT/US2008/012125, filed Oct. 24, 2008.

International Search Report dated Jan. 7, 2009, issued in related International Patent Application No. PCT/US2008/012125, filed Oct. 24, 2008.

Miller et al., "Metal Oxide Composited and Structures for Ultra-High Temperature Solar Thermochemical Cycles," 2008, J. Mater. Sci., 43; pp. 4714-4728.

* cited by examiner

*Primary Examiner* — Timothy Vanoy
(74) *Attorney, Agent, or Firm* — Kilpatrick Townsend & Stockton LLP (57) ABSTRACT

The present invention provides a method for storing thermal energy, such as solar energy, as a fuel, by heating a reactive oxide substrate to a first temperature, such that the reactive oxide substrate is reduced, wherein the reactive oxide substrate includes a cerium oxide. The method also includes contacting the reduced reactive oxide substrate at a second temperature with a gas mixture including carbon dioxide, wherein the first temperature is greater than the second temperature, thereby preparing the fuel. The present invention also provides a method for preparing the reactive oxide substrates by heating a mixture including a doped cerium oxide and a pore-forming agent, such that pores are formed in the doped cerium oxide, thereby forming the reactive oxide substrate.

7 Claims, 11 Drawing Sheets

X-ray diffraction pattern for cubic fluorite $Sm_{0.15}$-$Ce_{0.85}O_{1.925}$.

FIG. 6

X-ray diffraction pattern for 10% (w/w) Ni/$Sm_{0.15}$-$Ce_{0.85}O_{1.925}$ (before reduction). The markers indicate NiO peaks.

FIG. 7

X-ray diffraction pattern for 2% (w/w) Rh/Sm$_{0.15}$-Ce$_{0.85}$O$_{1.925}$. The markers indicate Rh peaks.

FIG. 8

X-ray diffraction pattern for 2% (w/w) Pt/Sm$_{0.15}$-Ce$_{0.85}$O$_{1.925}$. The markers indicate Pt peaks.

Schematic of the relative energies of product gases from the reaction of $Ce_2O_3$ with $CO_2$ and $H_2O$.

THERMOCHEMICAL SYNTHESIS OF FUELS FOR STORING THERMAL ENERGY

CROSS-REFERENCES TO RELATED APPLICATIONS

This application is a Continuation of U.S. application Ser. No. 12/257,840, now U.S. Pat. No. 8,167,961, filed Oct. 24, 2008 and claims the benefit of U.S. Provisional Application No. 61/000,500, filed Oct. 26, 2007, incorporated herein by reference in their entirety for all purposes.

BACKGROUND OF THE INVENTION

To enable the transition away from a fossil-fuel based energy economy, it is essential to address the problem of energy storage in addition to that of energy extraction from sustainable resources. In particular, if one is to utilize solar energy, a resource that is available in large excess relative to current consumption rates, the photon energy must be stored and made available for use after dark. Several possibilities are already being pursued in laboratories across the world including high energy density batteries, hydrogen production via electrolysis, and hydrogen production via direct photolysis. Despite these efforts, large-scale energy storage technologies remain elusive.

Due to the attractiveness of chemical fuels for energy storage and the relative ease with which heat can be extracted from other inputs, thermochemical production of hydrogen has received significant, though sporadic, interest over the past few decades (Funk, J. E. Int. J. Hydrogen Energy 26 185 (2001)). The most aggressively pursued reaction cycles at present are those involving (1) the high temperature dissociation of $ZnO(s)$ to $Zn(g)$ and $O_2(g)$ and (2) the partial reduction of $Fe_3O_4(s)$ to $FeO(s)$ and $O_2(g)$ or analogously $NiFe_2O_4(s)$ to $(Ni_{1/3}Fe_{2/3})O(s)$ and $O_2(g)$ (Kodama, T. & Gokon, N. Chem. Rev. 107, 4048-4077 (2007); Perkins, C. & Weimer, A. Int. J. Hydrogen Energy 29, 1587-1599 (2004); Steinfeld, A. Solar Energy 78, 603-615 (2005); Tamaura, Y., Steinfeld, A., Kuhn, P. & Ehrensberger, K. Energy 20, 325-330 (1995)). While development activities are ongoing in both classes, several fundamental challenges remain. In particular, key obstacles are connected to the structural transition (or change in phase) that these materials undergo in transforming between oxidized and reduced forms. For example, on reduction, solid ZnO transforms to gaseous Zn, whereas $Fe_3O_4$ with the spinel crystal structure transforms to FeO with the rock salt crystal structure. Such phase changes ultimately cause morphological changes that slow the kinetics of oxygen uptake and release and hence degrade fuel productivity with cycling. A second challenge with these thermochemical cycles is the absence of any demonstration to date of $CO_2$ reduction to produce conventional, carbon-containing fuels.

What is needed then is a material that can prepare fuels without undergoing performance degradation. Preliminary demonstrations of hydrogen production from $CeO_2$ have appeared in the literature in the past two years (Abanades, S. & Flamant, G. Sol. Energy 80, 1611 (2006)₄ Kaneko, H. et al. J. Mater. Sci. 43, 3153-3161 (2008); Kaneko, H. et al. Energy Fuels 21, 2287-2293 (2007); Kaneko, H. et al. Energy 32, 656-663 (2007); Kang, K.-S., Kim, C.-H., Park, C.-S. & Kim, J.-W. J. Ind. Eng. Chem. 13, 657-663 (2007); Miller, J. E. et al. J. Mater. Sci. 43, 4714-4728 (2008)). The present invention shows that, surprisingly, ceria can be used to prepare carbon containing fuels and, because oxygen uptake and release in ceria does not induce a structural change, ceria based materials can be cycled without a degradation in fuel productivity.

BRIEF SUMMARY OF THE INVENTION

In one embodiment, the present invention provides a method for preparing a fuel, by heating a reactive oxide substrate to a first temperature, such that the reactive oxide substrate is reduced, wherein the reactive oxide substrate includes a cerium oxide. The method also includes contacting the reduced reactive oxide substrate at a second temperature with a gas mixture including carbon dioxide, wherein the first temperature is greater than the second temperature, thereby preparing the fuel.

In a second embodiment, the present invention provides a method for preparing the reactive oxide substrates by heating a mixture including a doped cerium oxide and a pore-forming agent, such that pores are formed in the doped cerium oxide, thereby forming the reactive oxide substrate.

These and other embodiments, objects and aspects will become more apparent when read with the accompanying figures and detailed description.

BRIEF DESCRIPTION OF THE DRAWINGS

FIG. 1(a) shows the reaction cycle for the production of hydrogen; (b) shows the thermochemical cycling of ceria to produce methane; and (c) shows the thermochemical cycling of ceria to produce methanol.

FIG. 4 shows (a) fuel production curves and (b) $CH_4$ selectivity upon simultaneous reaction of $H_2O$ and $CO_2$ with reduced 10% (w/w) $Ni/Sm_{0.15}Ce_{0.85}O_{1.925}$ at the conditions indicated.

DETAILED DESCRIPTION OF THE INVENTION

I. General

The present invention provides a reactive oxide substrate and a method for converting thermal energy into a fuel. The conversion of thermal energy into a fuel allows for the storage of thermal energy, such as solar energy, for use during nighttime hours. In addition, the use of carbon dioxide as an input gas, in some embodiments, is useful for carbon mitigation.

Figure 1A:
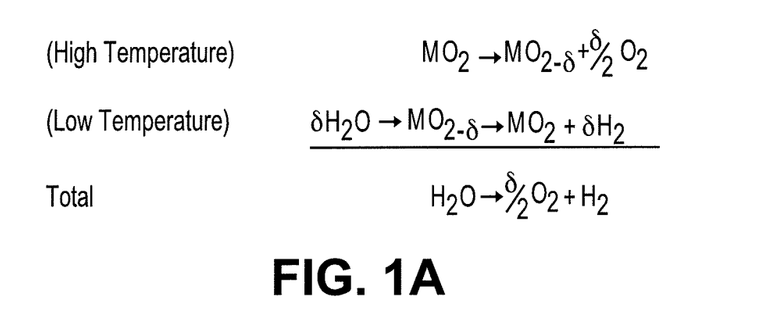
Figure 1B:
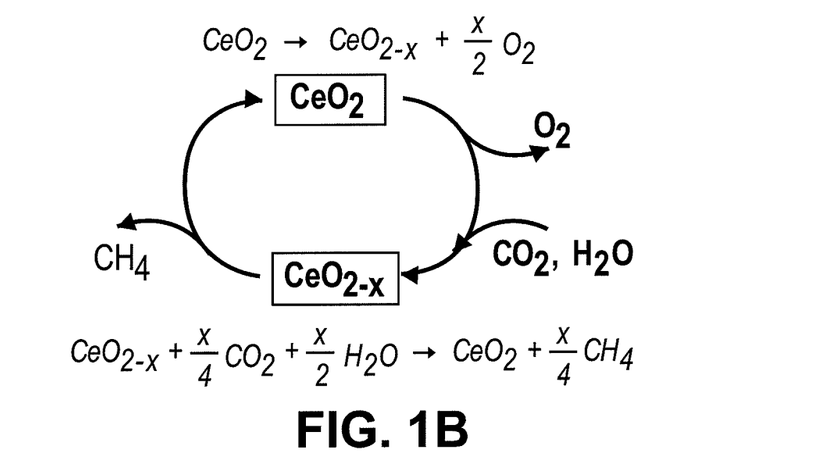
Figure 1C:
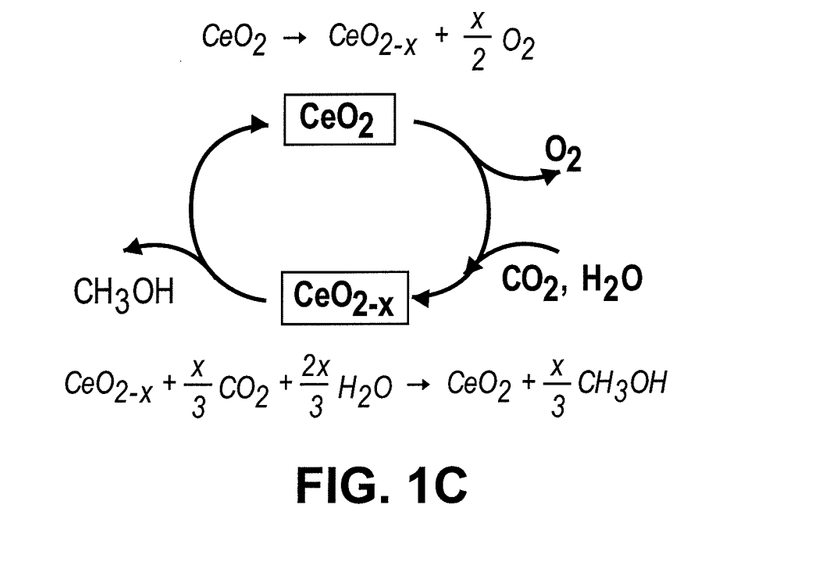
Figure 2:
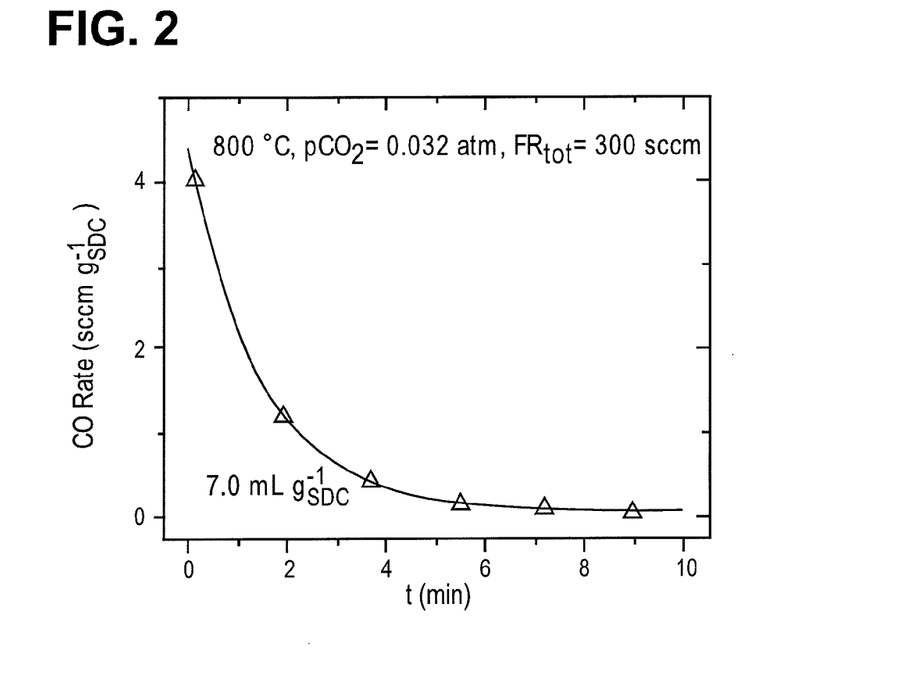
FIG. 2 shows a fuel production curve for CO upon reaction of $CO_2$ with reduced $Sm_{0.15}Ce_{0.85}O_{1.925-\delta}$ (SDC) at the conditions indicated. Fuel productivity is also indicated. $FR_{tot}$ indicates total flow rate. The temperatures shown indicate the initial temperature before flow of oxidants. Temperature excursion does not exceed 6° C. in all cases.
Figure 3:
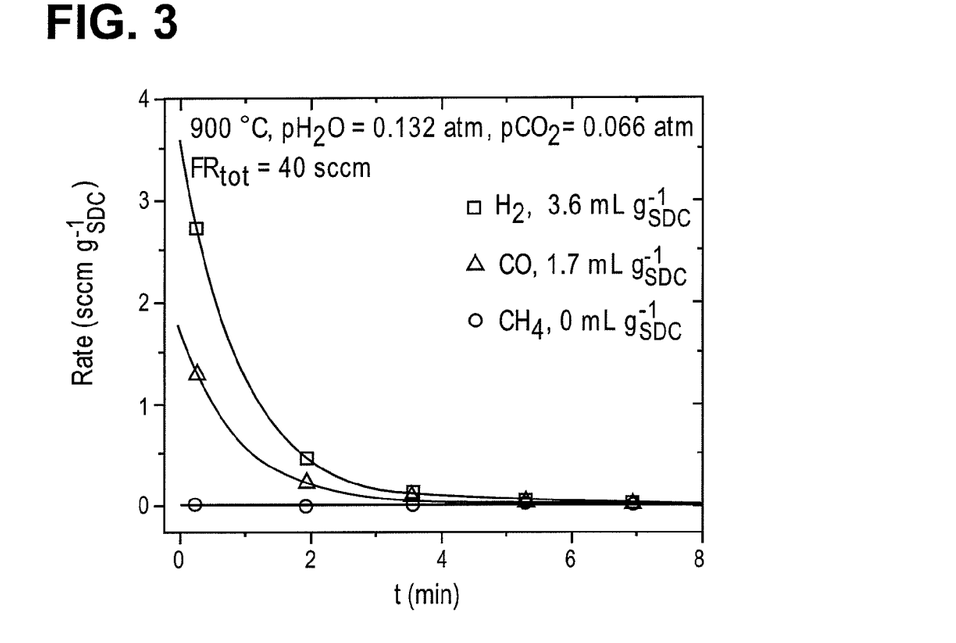
FIG. 3 shows syngas production curves upon simultaneous reaction of $H_2O$ and $CO_2$ with reduced SDC at the conditions indicated.
Figure 4A:
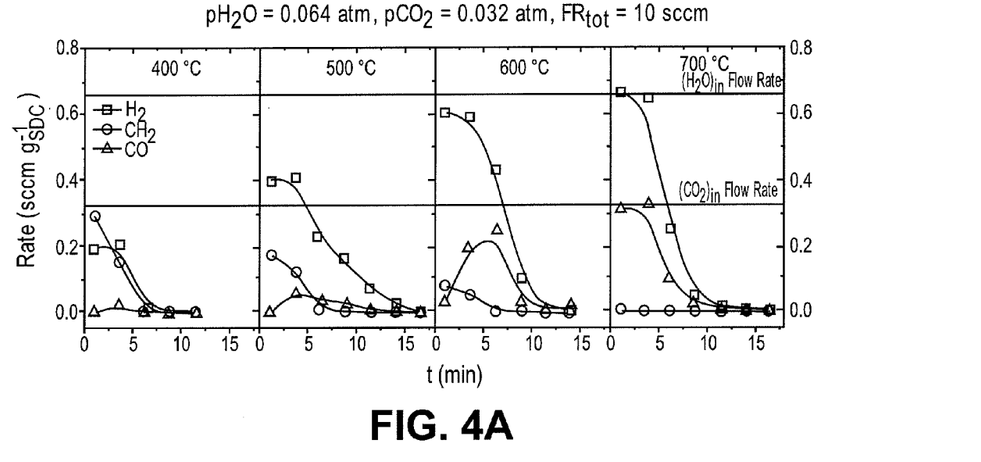
Figure 4B:
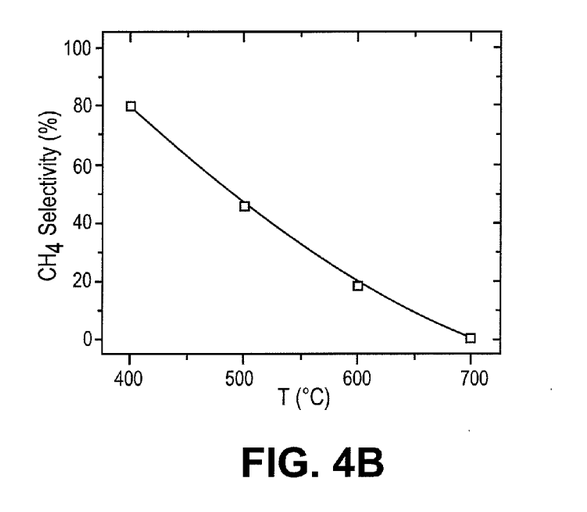
Figure 5:
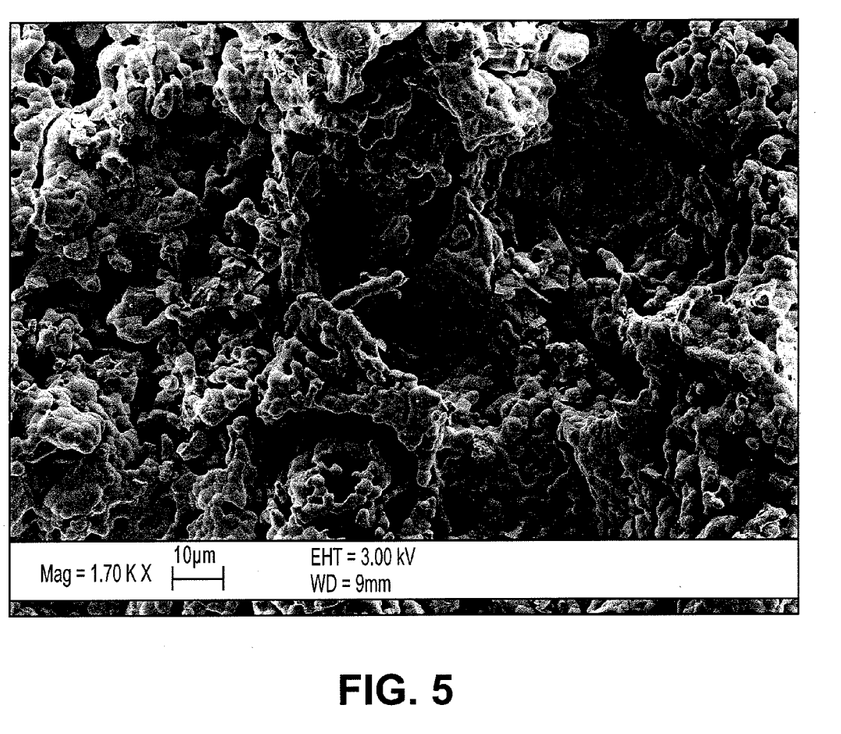
FIG. 5 shows a scanning electron micrograph of $Sm_{0.15}Ce_{0.85}O_{1.925}$ prepared by the method of the present invention.
Figure 6:
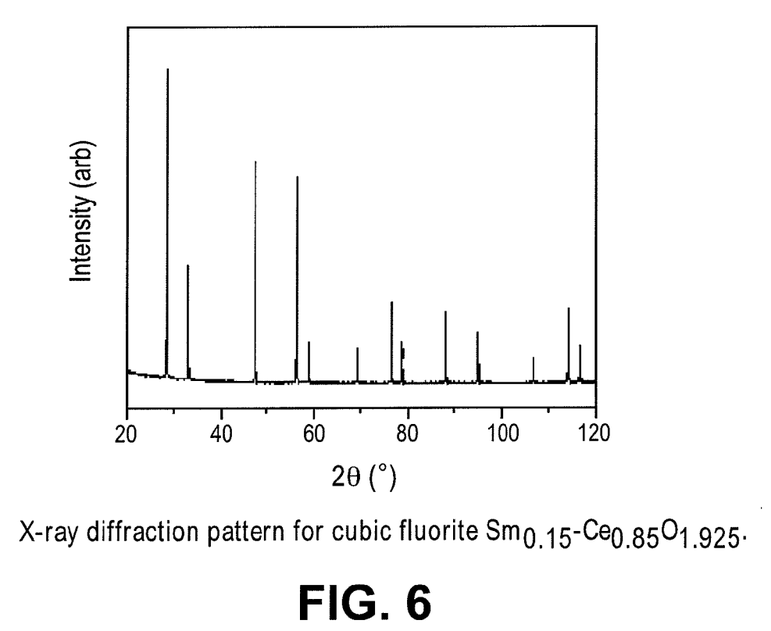
FIG. 6 shows an X-ray diffraction pattern for cubic fluorite $Sm_{0.15}Ce_{0.85}O_{1.925}$.
Figure 7:
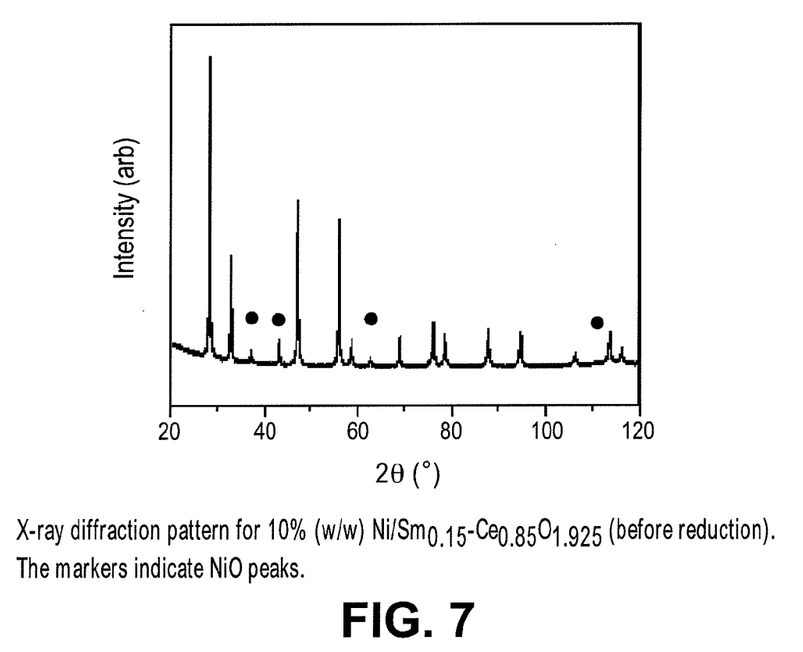
FIG. 7 shows an X-ray diffraction pattern for 10% (w/w) $Ni/Sm_{0.15}Ce_{0.85}O_{1.925}$ (before reduction). The markers indicate NiO peaks.
Figure 8:
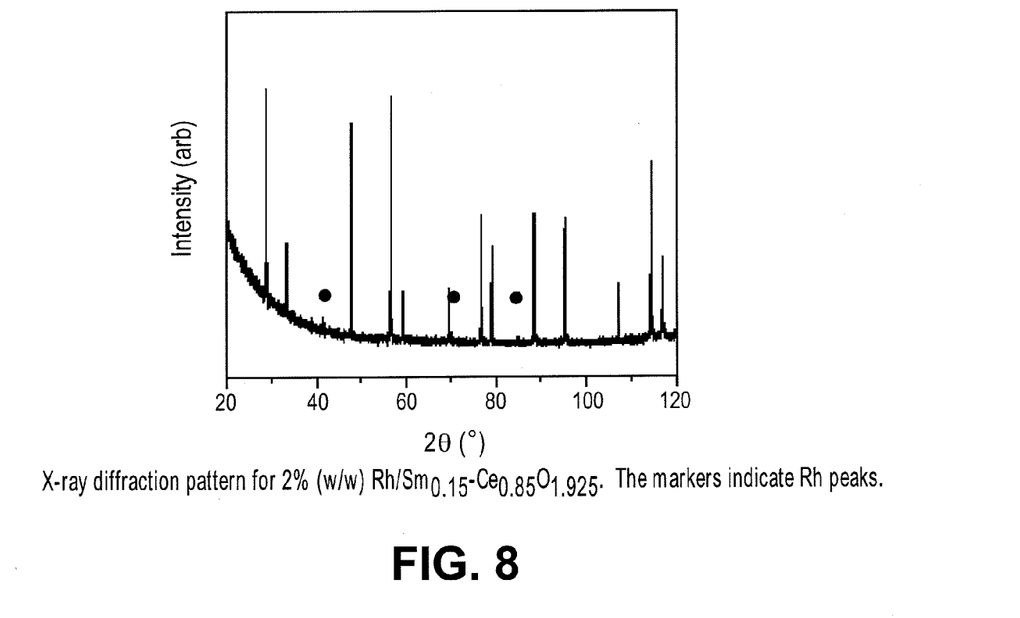
FIG. 8 shows an X-ray diffraction pattern for 2% (w/w) $Rh/Sm_{0.15}Ce_{0.85}O_{1.925}$. The markers indicate Rh peaks.
Figure 9:
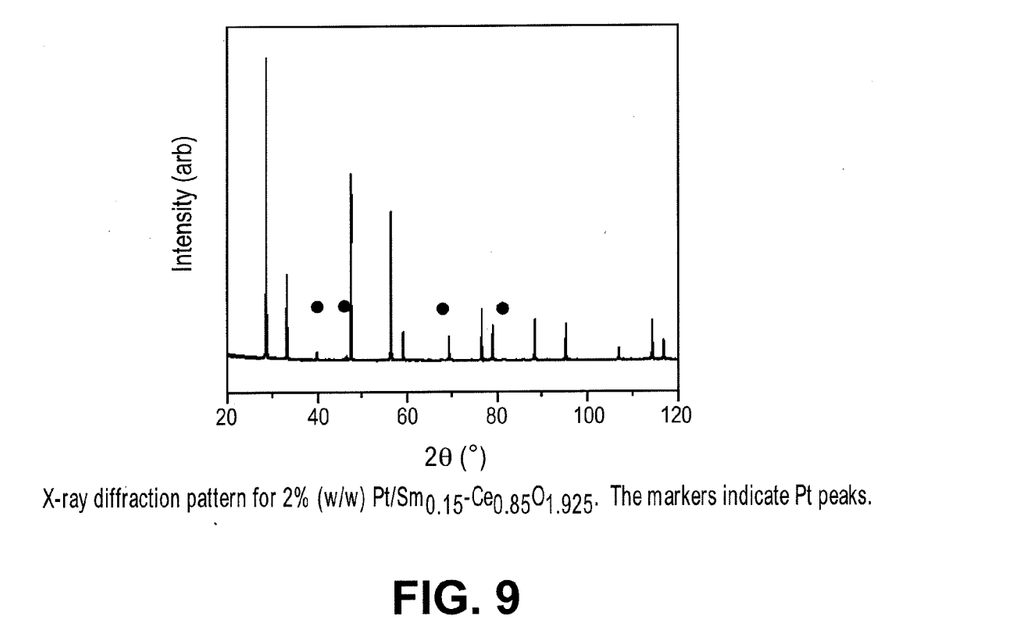
FIG. 9 shows X-ray diffraction patter for 2% (w/w) $Pt/Sm_{0.15}Ce_{0.85}O_{1.925}$. The markers indicate Pt peaks.
Figure 10:
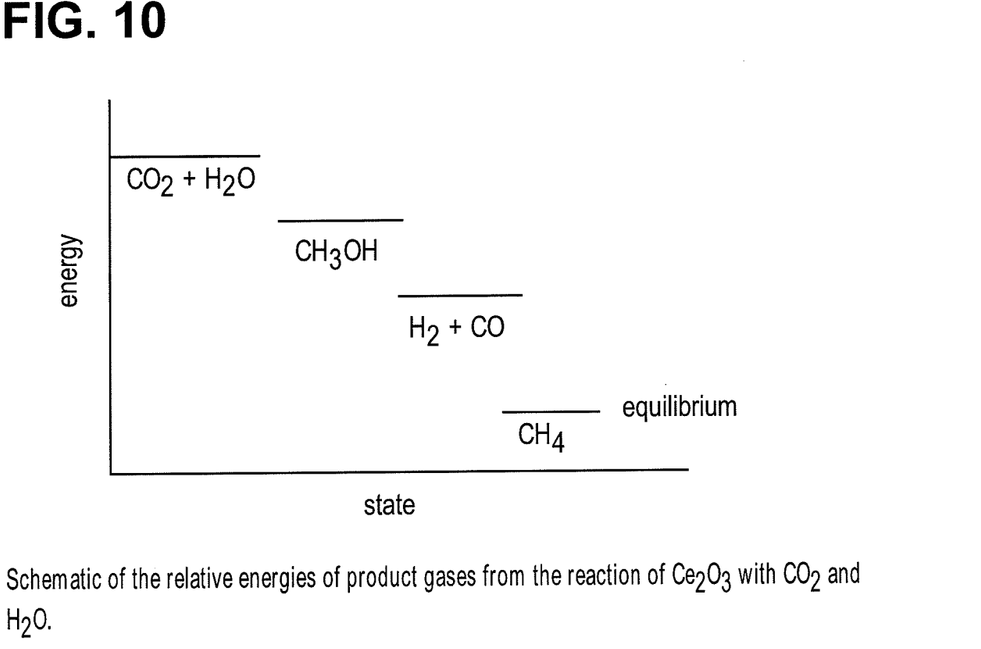
FIG. 10 shows a schematic of the relative energies of product gases from the reaction of $Ce_2O_3$ with $CO_2$ and $H_2O$ (supplied in a 1:2 ratio) between 300 and 700° C. While methane corresponds to the final equilibrium state, other reduced gases are possible depending on the activity and selectivity of incorporated catalysts.
Figure 11:
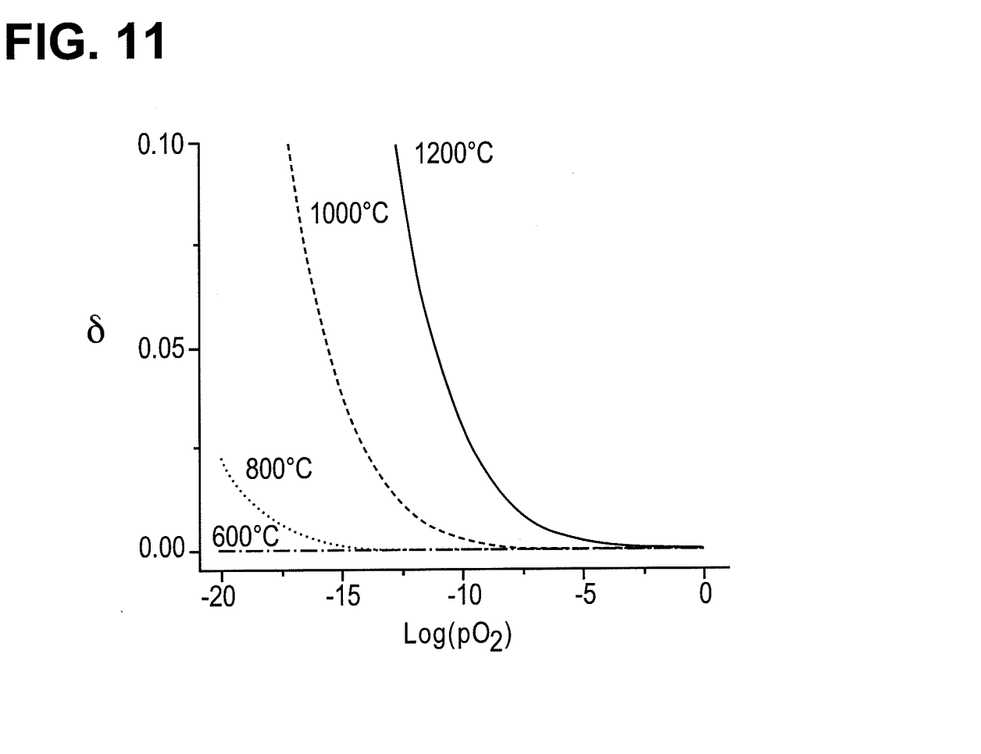
FIG. 11 shows the calculated nonstoichiometry of $Sm_{0.15}Ce_{0.85}O_{1.925-\delta}$.
Figure 12:
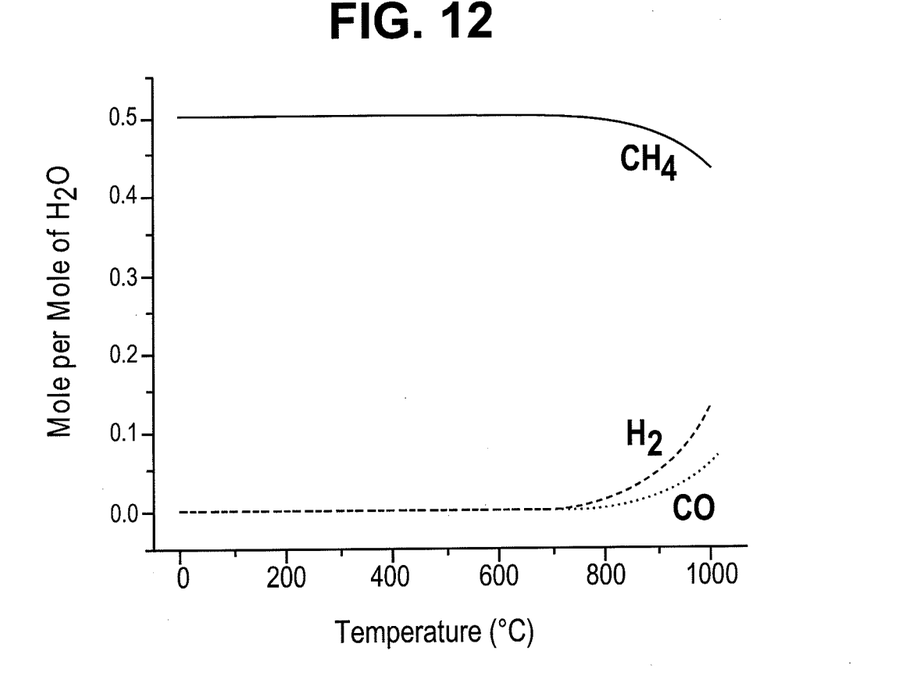
FIG. 12 shows the equilibrium composition calculated using Gibb's energy minimization method. Starting composition is 2:1 mole $H_2O:CO_2$ with excess $Ce_2O_3$. Pressure is isobaric at 1 bar.
Figure 13:
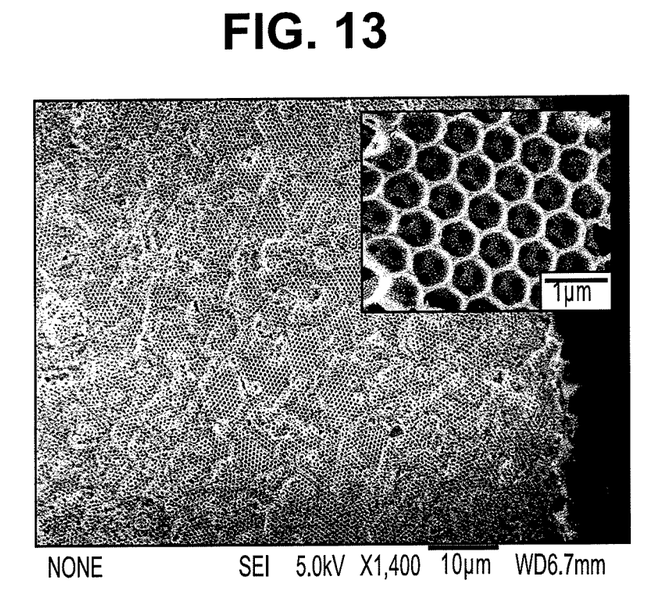
FIG. 13 shows a SEM of a ceria-zirconia inverse opal.
Figure 14:
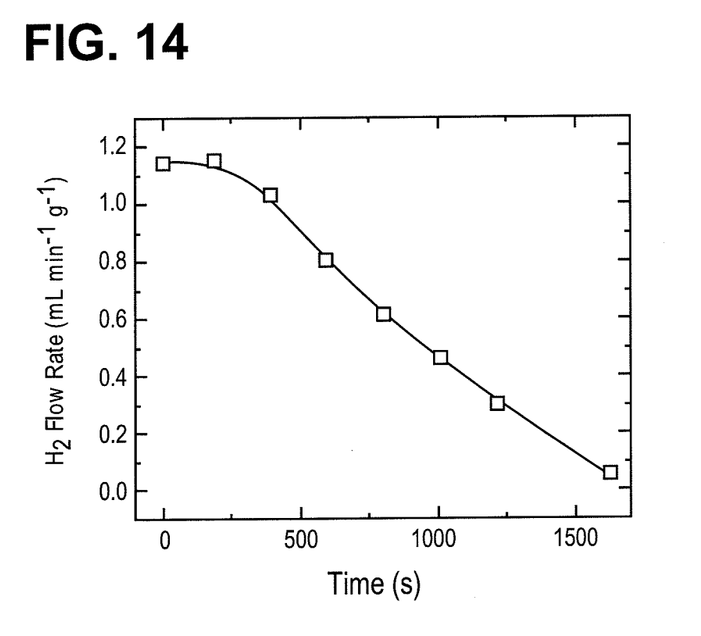
FIG. 14 shows hydrogen production from the reaction of water with reduced $Sm_{0.15}Ce_{0.85}O_{1.925-\delta}$ at 700° C.
Figure 15:
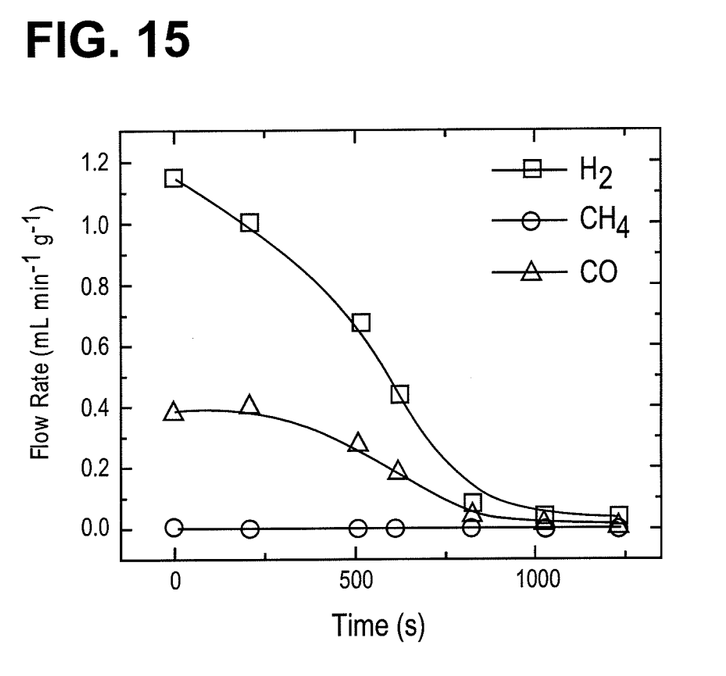
FIG. 15 shows the gas effluents detected from the reaction of $H_2O+CO_2$ (2:1 molar) with reduced $Sm_{0.15}Ce_{0.85}O_{1.925-\delta}$ at 700° C.
Figure 16:
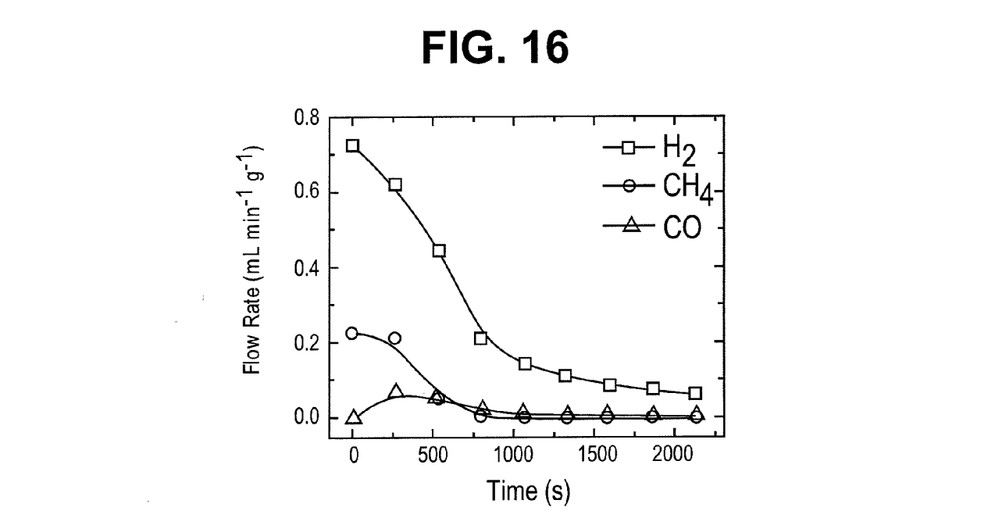
FIG. 16 shows the gas effluents detected from the reaction of $H_2O+CO_2$ (2:1 molar) with reduced $Rh/Sm_{0.15}Ce_{0.85}O_{1.925-\delta}$ at 500° C.
Figure 17:
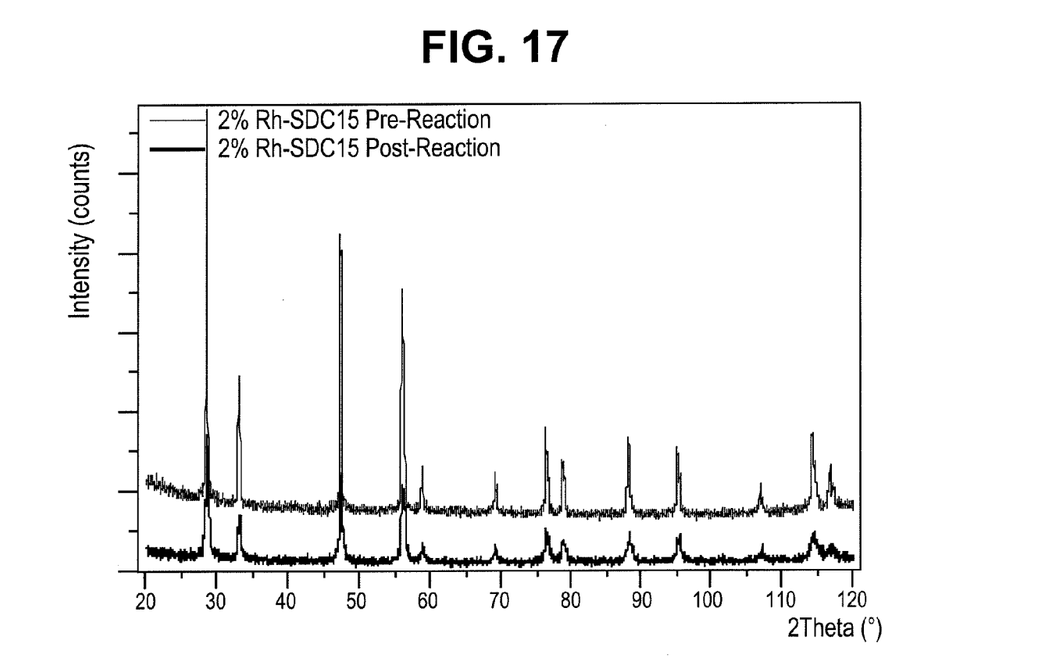
FIG. 17 shows the X-ray diffraction pattern of 2% $Rh/Sm_{0.15}Ce_{0.85}O_{1.925-\delta}$ before and after thermochemical cycling.
Figure 18:
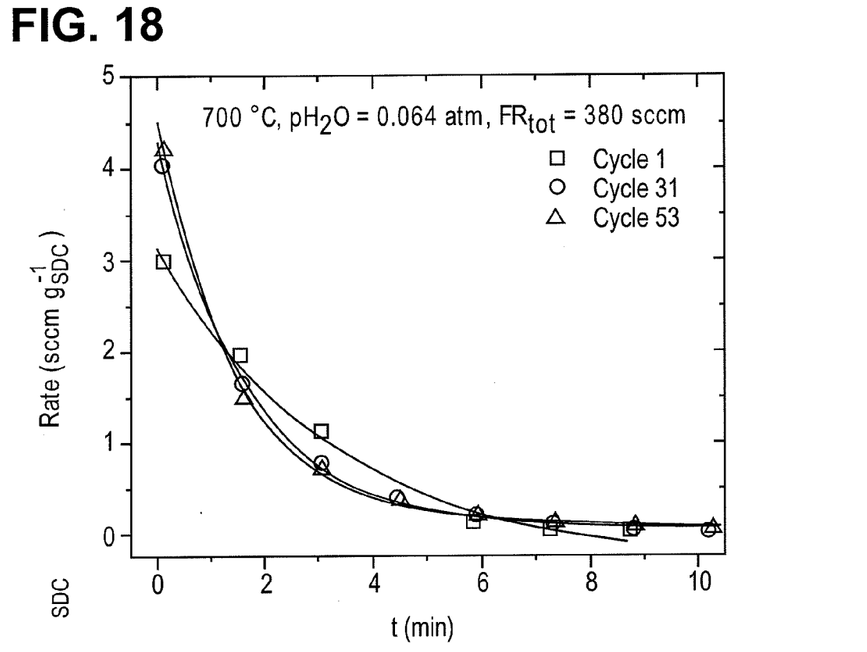
FIG. 18 shows $H_2O$ splitting ability over $Sm_{0.15}Ce_{0.85}O_{1.925-\delta}$ is largely unchanged after 53 redox cycles.
Figure 19:
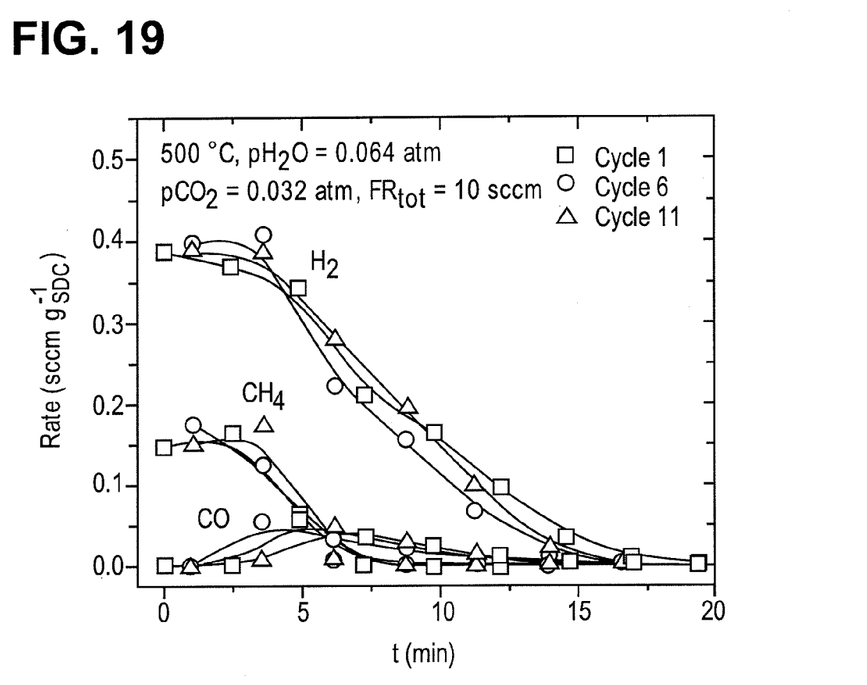
FIG. 19 shows $H_2O$ & $CO_2$ splitting as well as $CH_4$ selectivity over $Ni$—$Sm_{0.15}Ce_{0.85}O_{1.925-\delta}$ is stable after 11 redox cycles.

In some embodiments, the reactive oxide substrates of the present invention include a samarium doped ceria. The reactive oxide substrate can be used to prepare a fuel by first heating the reactive oxide substrate such that a reduced form of the reactive oxide substrate is formed. In forming the reduced form of the reactive oxide substrate, the reactive oxide substrate releases molecular oxygen (see FIG. 1(a), where M represents both the cerium and the dopant). A second heating at a lower temperature in the presence of a gas mixture, such as carbon dioxide, water, or a combination thereof, oxidizes the reduced form of the reactive oxide substrate and reduces the components of the gas mixture. For example, molecular hydrogen, carbon monoxide and syngas can be prepared from water, carbon dioxide, and a combination of the two, respectively. Other fuels, such as methane, propane, butane and other alkanes can be prepared with the use of a catalyst, such as Ni, Pt or Rh, among others, deposited in the pores of the samarium doped ceria. The gas mixture of the present invention can tolerate a variety of diluent gasses, such as nitrogen and $H_2S$.

II. Definitions

As used herein, the term "fuel" includes gaseous or liquid substances that can themselves be burned, or combined with another substance and burned, to produce energy. Fuels useful in the present invention include, but are not limited to, molecular hydrogen ($H_2$), carbon monoxide, syngas ($H_2$ and CO), methane, and methanol.

As used herein, the term "reactive oxide substrate" includes a material capable of converting a gas mixture into a fuel, where the reactive oxide substrate includes a cerium oxide that is optionally doped, and optionally includes a catalyst.

As used herein, the term "reduced reactive oxide substrate" includes the reactive oxide substrate that has been reduced to release molecular oxygen. For example, when the reactive oxide substrate is cerium oxide, $CeO_2$, the reduced form is $CeO_{2-\delta}$, where $\delta$ is less than 0.5.

As used herein, the term "cerium oxide" includes $CeO_2$.

As used herein, the term "contacting" includes the process of bringing into contact at least two distinct species such that they can react. It should be appreciated, however, the resulting reaction product can be produced directly from a reaction between the added reagents or from an intermediate from one or more of the added reagents which can be produced in the reaction mixture.

As used herein, the term "gas mixture" includes the inlet gas that is converted to the fuel by the reactive oxide substrate. The gas mixture can contain a single gas, or several different gasses. The gas mixture can include gases such as water vapor, carbon dioxide, nitrous oxide, argon, nitrogen, hydrogen sulfide, and a combination thereof.

As used herein, the term "syngas" includes synthesis gas that contains molecular hydrogen and carbon monoxide in varying amounts. Syngas can also include other gasses, such as carbon dioxide.

As used herein, the term "dopant" includes an additive to a composition that is used in order to alter the properties of the composition. Dopants used in the present invention include, but are not limited to, transitions metals such as lanthanides.

As used herein, the term "transition metal" includes elements of the periodic table that include Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Hg and Ac. Other transition metals include the lanthanides (La, Ce, Pr, Nd, Pm, Sm, Eu, Gd, Tb, Dy, Ho, Er, Tm, Yb, and Lu) and actinides (Ac, Th, Pa, U, Np, Pu, Am, Cm, Bk, Cf, Es, Fm, Md, No, and Lr). One of skill in the art will appreciate that the transition metals described above can each adopt several different oxidation states, all of which are useful in the present invention. In some instances, the most stable oxidation state is formed, but other oxidation states are useful in the present invention.

As used herein, the term "samarium doped ceria (SDC)" includes cerium oxide that is doped with samarium.

As used herein, the term "catalyst" includes a metal or metallic component that is added to the cerium oxide or doped cerium oxide. The catalysts useful in the present invention include, but are not limited to, transition metals.

As used herein, the term "pore-forming agent" includes an agent used in the preparation of the reactive oxide substrate of the present invention that facilitates the formation of pores in the reactive oxide substrates of the present invention. Exemplary pore-forming agents include, but are not limited to, starch in a solvent such as ethanol. Other pore-forming agents useful in the present invention are described below.

As used herein, the term "deposited" includes the deposition of catalyst on the walls of the pores of the reactive oxide substrate.

III. Method for Preparing Fuels

The present invention provides a method for storing thermal energy, such as solar energy, as a fuel. In some embodiments, the present invention provides a method for preparing a fuel, by heating a reactive oxide substrate to a first temperature, such that the reactive oxide substrate is reduced, wherein the reactive oxide substrate includes a cerium oxide. The method also includes contacting the reduced reactive oxide substrate at a second temperature with a gas mixture including carbon dioxide, wherein the first temperature is greater than the second temperature, thereby preparing the fuel.

The source of thermal energy for the heating step can be any suitable source capable of generating temperatures greater than 1000° C. Sources capable of generating the necessary thermal energy include, but are not limited to, solar energy, including solar concentration, power generation stations such as nuclear reactors, geothermal sources, etc.

The first temperature is any temperature suitable for forming the reduced form of the reactive oxide substrate. In some embodiments, the first temperature is greater than about 500° C. In other embodiments, the first temperature is greater than about 1000° C. In some other embodiments, the first temperature is about 1500° C. Other temperatures for the first temperature are useful in the present invention.

The second temperature is any temperature suitable for preparing the fuel from the gas mixture and oxidizing the reduced form of the reactive oxide substrate. In some embodiments, the second temperature is from about 250° C. to about 1000° C. In other embodiments, the second temperature is from about 300° C. to about 800° C. In some other embodiments, the second temperature is from about 350° C. to about 700° C. In still other embodiments, the second temperature is from about 350° C. to about 600° C. In yet other embodiments, the second temperature is from about 350° C. to about 500° C. In still yet other embodiments, the second temperature is about 400° C.

The method of the present invention can be practiced at any suitable pressure. In some embodiments, the pressure is from about 0.1 atm to about 10 atm. In other embodiments, the pressure is from about 0.5 atm to about 5 atm. In some other embodiments, the pressure if from about 0.75 atm to about 2.5 atm. In still other embodiments, the pressure is about atmospheric pressure.

The gas mixture of the method can include any gas useful for the preparation of the fuel, as well as other inert or non-reactive gases. In some embodiments, the gas mixture includes carbon dioxide. In other embodiments, the gas mixture further includes water vapor. The method of the present invention is also tolerant to of other gases, such as nitrogen, hydrogen sulfide, and argon gasses.

When more than one gas is used in the gas mixture, any ratio of the different gasses can be used in the method. For example, when the gas mixture includes both water vapor and carbon dioxide, the ratio of partial pressure of water vapor ($pH_2O$) to partial pressure of carbon dioxide ($pCO_2$) can be from about 10:1 to about 1:10. In some embodiments, the ratio can be from about 10:1 to about 1:1. In other embodiments, the ratio can be from about 5:1 to about 1:1. In some other embodiments, the ratio can be from about 3:1 to about 1:1. In still other embodiments, the ratio can be about 2:1. Other ratios are useful in the method of the present invention.

The method of the present invention can prepare any fuel. In some embodiments, the fuel includes carbon monoxide. In other embodiments, the fuel includes a mixture of hydrogen and carbon monoxide (syngas). In some other embodiments, the fuel includes an alkane (such as $C_1$-$C_8$), such as methane, propane, butane, pentane, hexane, heptane, octane and combinations thereof. In still other embodiments, the fuel includes an alcohol, such as methanol, propanol, butanol, pentanol, hexanol, heptanol and combinations thereof. Other fuels are useful in the method of the present invention.

IV. Reactive Oxide Substrate

The reactive oxide substrates useful in the method of the present invention include any reactive oxide substrate. In some embodiments, the reactive oxide substrate includes cerium oxide, $CeO_2$.

In other embodiments, the cerium oxide can include a dopant to form a doped cerium oxide. Dopants useful in the doped cerium oxide include, but are not limited to transition metals such as Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Hg and Ac. Other transition metals include the lanthanides (La, Ce, Pr, Nd, Pm, Sm, Eu, Gd, Tb, Dy, Ho, Er, Tm, Yb, and Lu) and actinides (Ac, Th, Pa, U, Np, Pu, Am, Cm, Bk, Cf, Es, Fm, Md, No, and Lr). In some other embodiments, the dopant can be a lanthanide. In still other embodiments, the dopant can be samarium, to provide samarium doped ceria (SDC). In yet other embodiments, the dopant can be gadolinium, to provide gadolinium doped ceria (GDC). In still yet other embodiments, the dopant can be yttrium or zirconium.

The cerium oxide of the present invention can be doped with any amount of dopant. In some embodiments, the dopant is present in a molar ratio of dopant to cerium of less than about 1:1. In other embodiments, the dopant is present in an amount of less than about 1:2 dopant to ceria. In some other embodiments, the dopant is present in an amount of less than about 1:3 dopant to ceria. In still other embodiments, the dopant is present in an amount of less than about 1:4 dopant to ceria. In yet other embodiments, the dopant is present in an amount of less than about 1:6 dopant to ceria. In still yet other embodiments, the dopant is present in an amount of about 15:85 dopant to ceria. For example, the doped cerium oxide can be $Sm_{0.15}Ce_{0.85}O_{1.925-\delta}$, wherein $\delta$ is less than about 0.5.

The cerium oxide of the present invention can adopt a variety of architectures. In some embodiments, the cerium oxide adopts an architecture having pores, such as an inverse opal architecture. The reactive oxide substrates of the present invention can adopt a variety of forms, including, but not limited to, the particulate form (coarse) or a self-supporting monolith of the inverse opal architecture. Other cerium oxide architectures useful in the present include, but are not limited to, loose powder and a uniform, porous, non-agglomerating architecture.

The cerium oxide of the present invention can have pores of any size. In some embodiments, the pores are from about 10 nm to about 100 μm in diameter. In other embodiments, the pores are from about 200 nm to about 20 μm in diameter. Other pore sizes are also useful in the present invention.

The cerium oxide of the present invention can have any suitable surface area. In some embodiments, the surface area of the cerium oxide can be greater than $1 \text{ m}^2 \text{ g}^{-1}$. In other embodiments, the surface area of the cerium oxide can be greater than $10 \text{ m}^2 \text{ g}^{-1}$. In still other embodiments, the surface area of the cerium oxide can be greater than $25 \text{ m}^2 \text{ g}^{-1}$. In yet other embodiments, the surface area of the cerium oxide can about $32 \text{ m}^2 \text{ g}^{-1}$. The cerium oxide useful in the present invention can be prepared according to methods known in the art, or can be obtained from commercial sources such as NexTech Materials of Lewis Center, Ohio.

The cerium oxide of the present invention can have any suitable particle size. In some embodiments, the particles can be from about 100 nm to about 1000 μm in size. In other embodiments, the particles can be from about 150 μm to about 500 μm in size. In some other embodiments, the particles can be from about 100 nm to about 10 μm in size In some embodiments, the reactive oxide substrate of the present invention can include a catalyst. Catalysts useful in the reactive oxide substrate include, but are not limited to, transition metals such as Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Hg and Ac. In other embodiments, the catalyst can be Fe, Co, Ni, Ru, Rh, Pd, Os, Ir or Pt. In some other embodiments, the catalyst can be Ni, Pt or Rh. In still other embodiments, the catalyst is Ni. In yet other embodiments, the catalyst is Pt. In still yet other embodiments, the catalyst is Rh.

The catalyst can be present in any amount of the reactive oxide substrate. In some embodiments, the catalyst is present in an amount of less than about 50% (w/w) of the reactive oxide substrate. The catalyst can also be present in an amount of less than about 40, 30, 20, 15, 10, 9, 8, 7, 6, 5, 4, 3, 2, or 1% (w/w) of the reactive oxide substrate. In other embodiments, the catalyst is present in about 10% (w/w) of the reactive oxide substrate. In some other embodiments, the catalyst is present in about 2% (w/w) of the reactive oxide substrate.

In some embodiments, the reactive oxide substrate can be about 10% (w/w) Ni—$Sm_{0.15}Ce_{0.85}O_{1.925-\delta}$. In other embodiments, the reactive oxide substrate can be about 2% (w/w) Pt—$Sm_{0.15}Ce_{0.85}O_{1.925-\delta}$. In still other embodiments, the reactive oxide substrate can be about 2% (w/w) Rh—$Sm_{0.15}Ce_{0.85}O_{1925-\delta}$.

V. Method of Preparing the Reactive Oxide Substrate

In some embodiments, the reactive oxide substrates can be prepared by heating a mixture including a doped cerium oxide and a pore-forming agent, such that pores are formed in the doped cerium oxide, thereby forming the reactive oxide substrate.

The heating step of the method can heat the mixture to any suitable temperature for forming pores. In some embodiments, the temperature is greater than about 500° C. In other embodiments, the temperature is greater than about 1000° C. In some other embodiments, the temperature is about 1500° C. Other temperatures are useful in the present invention.

The pore-forming agent can be any agent capable of forming pores in the doped cerium oxide. For example, the pore-forming agent can be a polymer such as polystyrene, polymethyl methacrylate, polyvinyl alcohol, polyvinyl acetate, polyvinyl pyrrolidone, rice starch, etc. The pore-forming agent can also be graphite or ZnO. In addition, the pore-forming agent can include any water soluble salt such as sodium chloride, sodium sulphate, etc. Additional pore-forming agents include volatile compound such as naphthalene, etc. In some embodiments, the pore-forming agent can be starch in a suitable solvent. The solvent includes, but is not limited to, alkanes, alcohols, and ethers. In other embodiments, the solvent is ethanol. Other pore-forming agents are useful in the present invention.

When the pore-forming agent is starch, the starch can be present in the solvent in any suitable amount. In some embodiments, the pore-forming agent includes less than about 75% (w/w) of starch in ethanol. In other embodiments, the pore-forming agent includes from about 60% to about 5% (w/w) of starch in ethanol. In some other embodiments, the pore-forming agent includes from about 40% to about 20% (w/w) of starch in ethanol. In still other embodiments, the pore-forming agent includes about 30% (w/w) of starch in ethanol.

When the reactive oxide substrate includes a catalyst, the method for preparing the reactive oxide substrate also includes a second heating of the reactive oxide substrate in the presence of a catalyst, such that the catalyst is deposited in the pores of the reactive oxide substrate. The method also includes a third heating of the reactive oxide substrate, wherein the third heating is at a temperature greater than the temperature of the second heating.

The second heating step of the method can heat the mixture to any suitable temperature for depositing the catalyst in the pores of the reactive oxide substrate. In some embodiments, the temperature is from about 250° C. to about 1500° C. In other embodiments, the temperature is from about 500° C. to about 1000° C. In some other embodiments, the temperature is about 750° C.

The third heating step of the method can heat the mixture to any suitable temperature that is greater than the temperature of the second heating step. In some embodiments, the temperature is from about 750° C. to about 2000° C. In other embodiments, the temperature is from about 1000° C. to about 1750° C. In some other embodiments, the temperature is about 1350° C.

The method of the present invention can be practiced at any suitable pressure. In some embodiments, the pressure is from about 0.1 atm to about 10 atm. In other embodiments, the pressure is from about 0.5 atm to about 5 atm. In some other embodiments, the pressure if from about 0.75 atm to about 2.5 atm. In still other embodiments, the pressure is about atmospheric pressure.

The present invention also provides the reactive oxide substrate prepared by heating a mixture including a doped cerium oxide and a pore-forming agent, such that pores are formed in the doped cerium oxide, thereby forming the reactive oxide substrate. The method can optionally include a second heating of the reactive oxide substrate in the presence of a catalyst, such that the catalyst is deposited in the pores of the reactive oxide substrate; and a third heating of the reactive oxide substrate, wherein the third heating is at a temperature greater than the temperature of the second heating.

VI. EXAMPLES

Example 1

Preparation of Reactive Oxide Substrate $Sm_{0.15}Ce_{0.85}O_{1.925}$ (NexTech SDC15, surface area=32 m$^2$ g$^{-1}$) was ball milled with 30 wt % starch in ethanol, uniaxially pressed into a pellet, and sintered at 1500° C. for 24 h. The pellet was then lightly crushed and sieved to obtain particle size between 150 and 500 μm. 10 wt % Ni-SDC was prepared via wetness impregnation by dissolving the appropriate amount of $Ni(NO_3)_2.6H_2O$. After calcining at 750° C., the powder was sintered at 1350° C. for 24 h, pressed into a pellet, lightly crushed, and sieved as described above. SDC without the addition of metal catalyst was also prepared identically as the 10 wt % Ni-SDC.

The above method was followed for the preparation of 2 wt % Pt—$Sm_{0.15}Ce_{0.85}O_{1.925}$ Using $(NH_3)_4NNO_3)_2$ and 2 wt % Rh—$Sm_{0.15}Ce_{0.85}O_{1.925}$ using $Rh(NO_3)_3.2H_2O$.

Example 2

Preparation of CO and Syngas Fuels

Samples containing 1000 mg of SDC were loaded into a 10 mm diameter continuous flow packed bed reactor with the particles held in place by a porous quartz frit. Reaction gases were delivered by digital mass flow controllers, and the effluent gas was measured by a Varian CP-4900 gas chromatograph equipped with PoraPak Q and Molecular Sieve 5A columns. $H_2$, $CH_4$, CO and $CO_2$ concentrations were converted to flow rates using an internal $N_2$ standard, which also served as a diluent. In some cases, Ar was also used as a diluent. GC calibration curves were established using analytical grade premixed gases.

The reduction of ceria was achieved by flowing a mixture of $H_2$, $H_2O$, and Ar at either $Po_2$=2.0×10$^{-21}$ atm at 800° C. or 3.8×10$^{-18}$ atm at 900° C. Humidification was achieved by bubbling the reaction gas through a H₂O bubbler inside a temperature controlled bath. The oxidation of ceria was achieved by passing diluted water vapor, carbon dioxide, separately or simultaneously, over the packed bed of ceria particles. The temperature excursion upon oxidation of the ceria in no case exceeded 6° C.

Example 3

Preparation of Methane

The method of Example 2 was followed using 10 wt % Ni—$Sm_{0.15}Ce_{0.85}O_{1.925}$ at 400° C. for the oxidation step.

Although the foregoing invention has been described in some detail by way of illustration and example for purposes of clarity of understanding, one of skill in the art will appreciate that certain changes and modifications may be practiced within the scope of the appended claims. In addition, each reference provided herein is incorporated by reference in its entirety to the same extent as if each reference was individually incorporated by reference.

What is claimed is:

1. A method for preparing a reactive oxide substrate in the absence of solid support, the method comprising:
    sintering a mixture comprising a doped cerium oxide and a pore-forming agent, such that pores are formed in the doped cerium oxide, wherein the sintering is at a temperature of greater than about 1000° C., thereby forming the reactive oxide substrate.

2. The method of claim 1, wherein the pore-forming agent comprises about 30% (w/w) starch in ethanol.

3. The method of claim 1, wherein the method further comprises
    calcining the reactive oxide substrate in the presence of a catalyst, such that the catalyst is deposited in the pores of the reactive oxide substrate, wherein the calcining is at a temperature of from about 500° C. to about 1000° C.; and
    sintering the reactive oxide substrate, wherein the sintering is at a temperature of from about 1000° C. to about 1750° C.

4. The method of claim 3, wherein the second sintering is at a temperature of about 1350° C.

5. The method of claim 1, wherein the sintering is at a temperature of about 1500° C.

6. The method of claim 1, wherein the calcining is at a temperature of about 750° C.

7. The method of claim 1, wherein the reactive oxide substrate forms particles having a diameter of from about 150 to about 500 μm.

* * * * *